(12) United States Patent
Li

(10) Patent No.: US 7,638,240 B2
(45) Date of Patent: Dec. 29, 2009

(54) CATHODE MATERIAL, METHOD OF MANUFACTURING THE SAME, AND BATTERY USING THE SAME

(75) Inventor: Guohua Li, Kanagawa (JP)

(73) Assignee: Sony Corporation, Tokyo (JP)

( * ) Notice: Subject to any disclaimer, the term of this patent is extended or adjusted under 35 U.S.C. 154(b) by 475 days.

(21) Appl. No.: 10/813,542

(22) Filed: Mar. 30, 2004

(65) Prior Publication Data

US 2004/0234855 A1 Nov. 25, 2004

(30) Foreign Application Priority Data

Apr. 3, 2003 (JP) ............ P2003-100758

(51) Int. Cl.
*H01M 4/50* (2006.01)
*H01M 4/48* (2006.01)

(52) U.S. Cl. .......... 429/224; 429/231.5; 429/231.6; 29/623.1

(58) Field of Classification Search .......... 429/224, 429/231.5, 231.6; 29/623.1
See application file for complete search history.

(56) References Cited

U.S. PATENT DOCUMENTS 6,168,887 B1 * 1/2001 Dahn et al. ............ 429/224
6,368,750 B1 * 4/2002 Nemoto et al. ......... 429/231.95

FOREIGN PATENT DOCUMENTS

JP 2001122628 A * 5/2001
JP 2003068282 A * 3/2003

OTHER PUBLICATIONS

Jaephil Cho and Byungwoo Park; Li2+xMn0.91Cr1.09O4 Cathode Materials for Li-Ion Cells; Electrochemical and Solid-State Letters; 3 (8) 355-358; 2000.
Brett Ammundsen et al.; Local Structure and First Cycle Redox Mechanism of Layered Li1.2Cr0.4Mn0.4O2 Cathode Material; Journal of the Electrochemical Society; 149 (4) A431-A436; 2002.

* cited by examiner

*Primary Examiner*—Tracy Dove
(74) *Attorney, Agent, or Firm*—Sonnenschien Nath & Rosenthal LLP

(57) ABSTRACT

Provided are a cathode material capable of improving battery characteristics by improving its structural stability, a method of manufacturing the cathode material, and a battery using the cathode material. A cathode comprises a complex oxide represented by $Li_aMn_bCr_cAl_{1-b-c}O_d$ or $Li_{1+e}(Mn_fCr_gM_{1-f-g})_{1-e}O_h$. the values lof a through h are within a range of $1.0<a<1.6$, $0.5<b+c<1$, $1.8<d<2.5$, $0<e<0.4$, $0.2<f<0.5$, $0.3<g<1$, $f+g<1$ and $1.8<h<2.5$, and M is at least one kind selected from the group consisting of Ti, Mg and Al. The crystalline structure can be stabilized by Ti, Mg or Al, and charge-discharge cycle characteristics can be improved. Moreover, the charge capacity can be improved by an excessive amount of lithium, and even after charge, a certain amount of lithium remains in the crystalline structure, so the stability of the crystalline structure can be further improved.

6 Claims, 16 Drawing Sheets

US 7,638,240 B2

CATHODE MATERIAL, METHOD OF MANUFACTURING THE SAME, AND BATTERY USING THE SAME

RELATED APPLICATION DATA

The present application claims priority to Japanese Application(s) No(s). P2003-100758 filed Apr. 3, 2003, which application(s) is/are incorporated herein by reference to the extent permitted by law.

BACKGROUND OF THE INVENTION

1. Field of the Invention

The present invention relates to a cathode material comprising a complex oxide including lithium (Li), manganese (Mn), chromium (Cr) and at least one kind selected from the group consisting of titanium (Ti), magnesium (Mg) and aluminum (Al), a method of manufacturing the cathode material, and a battery using the cathode material.

2. Description of the Related Art

In recent years, with significant advances of various electronic devices, studies of rechargeable secondary batteries as power sources which can be conveniently and economically used for a long time have been progressing. As typical secondary batteries, lead-acid batteries, alkaline batteries, lithium secondary batteries and the like are known. Among them, the lithium secondary batteries have advantages that higher power and higher energy density can be achieved.

The lithium secondary batteries comprise a cathode capable of reversibly inserting and extracting lithium ions, an anode and an electrolyte. As a cathode material, for example, a metal oxide, a metal sulfide or a polymer is used. More specifically, a compound not including lithium such as $TiS_2$, $MoS_2$, $NbSe_2$ or $V_2O_5$, a lithium complex oxide including lithium such as $LiMO_2$ (M=Co, Ni, Mn, Fe or the like) or $LiMn_2O_4$ is known.

Among them, $LiCoO_2$ is widely and practically used as a cathode material having a potential of approximately 4 V relative to a lithium metal potential, and is an ideal cathode material in various aspects because $LiCoO_2$ has a higher energy density and a higher voltage. However, Co (cobalt) as a resource is unevenly distributed and scarce, so there is a problem that it is difficult to stably supply Co, thereby a material cost becomes higher.

Therefore, instead of $LiCoO_2$, a cathode material including abundant and low-cost nickel (Ni) or manganese (Mn) as a base holds promise.

Although $LiNiO_2$ has a large theoretical capacity and a high discharge potential, its crystalline structure collapses in accordance with the progress of a charge-discharge cycle, thereby resulting in a decline in a discharge capacity and lower thermostability.

Moreover, $LiMn_2O_4$ with a normal spinel structure has as high a potential as $LiCoO_2$, and can obtain a high battery capacity. Further, $LiMn_2O_4$ can be easily synthesized. However, there are problems such as insufficient stability and insufficient cycle characteristics, that is, degradation in capacity is large during storage at high temperature, and manganese is dissolved in an electrolyte solution.

Moreover, although $LiMnO_2$ with a layer structure can obtain a higher capacity than $LiMn_2O_4$, there are problems that it is difficult to synthesize $LiMnO_2$, and when a charge-discharge cycle is repeated, the structure becomes unstable, and the capacity declines.

In order to overcome the problems, $Li_{2+x}Mn_{0.91}Cr_{1.09}O_4$ in which a part of manganese is substituted with chromium and a large amount of lithium is included has been proposed as a cathode material (refer to, for example, Electrochemical and Solid-State Letters Vol. 3, No. 8, p. 355, 2000). However, in the cathode material, there is a problem that cycle characteristics at room temperature are not sufficient. Moreover, the cathode material is formed through synthesizing $Mn_{0.91}Cr_{1.09}O_4$ by reaction in a solution using methanol as a dispersion medium, and then firing a lithium salt and $Mn_{0.91}Cr_{1.09}O_4$ in an atmosphere of nitrogen, so the cathode material has disadvantages that toxic methanol is used, and two-step reaction is required.

Moreover, in Journal of The Electrochemical Society Vol. 149, No. 4, p. A431, 2002, $Li_{1.2}Mn_{0.4}Cr_{0.4}O_4$ is proposed as a cathode material. In the cathode material, when charge is performed until reaching 4.4 V at a voltage relative to lithium, and then discharge is performed until reaching 2.5 V, an initial charge capacity of 258 mAh/g, and an initial discharge capacity of 173 mAh/g can be obtained; however, cycle characteristics at room temperature are not sufficient.

SUMMARY OF THE INVENTION

In view of the foregoing, it is a first object of the invention to provide a cathode material capable of improving battery characteristics by improving its structural stability, and a battery using the cathode material.

It is a second object of the invention to provide a method of manufacturing a cathode material capable of being easily synthesized without using a highly toxic dispersion medium.

A cathode material according to the invention comprises: a complex oxide including lithium, manganese, chromium and at least one kind selected from the group consisting of titanium, magnesium and aluminum, wherein a composition ratio of lithium to the total of manganese, chromium, titanium, magnesium and aluminum in the complex oxide is larger than 1 in molar ratio.

In a method of manufacturing a cathode material according to the invention, the cathode material comprises a complex oxide including lithium, manganese, chromium and at least one kind selected from the group consisting of titanium, magnesium and aluminum, and the method comprising the step of mixing materials with ethanol or water as a dispersion medium to synthesize the complex oxide.

A battery according to the invention comprises: a cathode; an anode; and an electrolyte, wherein the cathode comprises a complex oxide including lithium, manganese, chromium and at least one kind selected from the group consisting of titanium, magnesium and aluminum, and a composition ratio of lithium to the total of manganese, chromium, titanium, magnesium and aluminum in the complex oxide is larger than 1 in molar ratio.

In the cathode material according to the invention, at least one kind selected from the group consisting of titanium, magnesium and aluminum is included, so its structural stability can be improved. Moreover, the composition of lithium is larger than 1, so a larger electrical capacity can be obtained during charge, and even after charge, a certain amount of lithium remains in the crystalline structure, so the stability of the crystalline structure can be maintained.

In the method of manufacturing a cathode material according to the invention, materials are mixed with less toxic ethanol or water as a dispersion medium.

In the battery according to the invention, the cathode material according to the invention is used, so a larger charge-discharge capacity and superior charge-discharge cycle characteristics can be obtained.

Other and further objects, features and advantages of the invention will appear more fully from the following description.

DETAILED DESCRIPTION OF THE PREFERRED EMBODIMENTS

Figure 1:
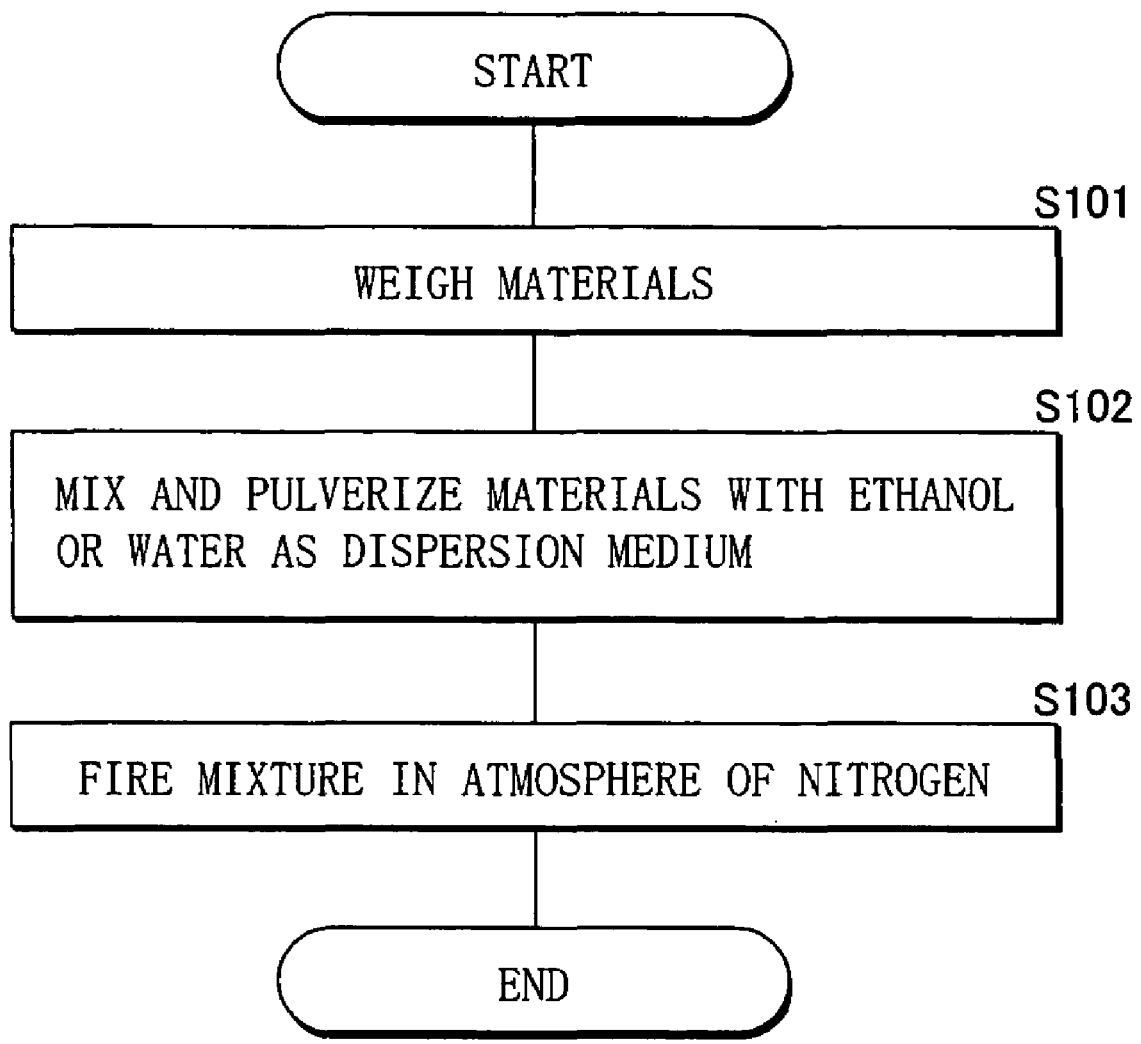
FIG. 1 is a flow chart showing a method of manufacturing a cathode material according to an embodiment of the invention.

Preferred embodiments of the present invention will be described in more detail below referring to the accompanying drawings.

A cathode material according to an embodiment of the invention comprises a complex oxide including lithium, manganese, chromium and at least one kind selected from the group consisting of titanium, magnesium and aluminum. The complex oxide has, for example, a layer structure, and, for example, a complex oxide represented by Chemical Formula 1 or 2 is preferable.

$$Li_a Mn_b Cr_c Al_{1-b-c} O_d$$ [Chemical Formula 1]

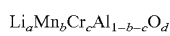

In the formula, the values of a, b, c and d are within a range of $1.0 < a < 1.6$, $0.5 < b+c < 1$, and $1.8 < d < 2.5$.

$$Li_{1+e}(Mn_f Cr_g M_{1-f-g})_{1-e} O_h$$ [Chemical Formula 2]

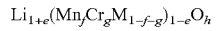

In the formula, M is at least one kind of element selected from the group consisting of titanium, magnesium and aluminum, and the values of e, f, g and h are within a range of $0 < e < 0.4$, $0.2 < f < 0.5$, $0.3 < g < 1$, $f+g < 1$ and $1.8 < h < 2.5$.

In the complex oxide, chromium has a function as a redox center, and manganese is provided for maintaining a layer structure. Titanium, magnesium and aluminum are provided for stabilizing a crystalline structure, and exist as substitution of a part of manganese and a part of chromium. Thereby, in the cathode material, its structure is stabilized, and the charge-discharge capacity is improved, and superior charge-discharge cycle characteristics can be obtained.

Moreover, in the complex oxide, a composition ratio of lithium to the total of manganese, chromium, titanium, magnesium and aluminum is larger than 1 in molar ratio. When the composition ratio is too small, impurities is increased, thereby a large charge capacity cannot be obtained. Further, when the composition ratio is larger than 1 to excessively include lithium, even after charge, a certain amount of lithium remains in the crystalline structure, so the stability of the crystalline structure can be maintained.

In Chemical Formulas 1 and 2, although the compositions a and 1+e of lithium can be selected within a range of 1 to 2, they are specified within a range of $1 < a < 1.6$ and $1 < 1+e < 1.4$, because when the compositions a and 1+e of lithium are too large, impurities are increased, thereby the crystalline structure changes, and the charge-discharge capacity declines. The compositions a and e are more preferably within a range of $1.1 < a \leq 1.55$ and $0.1 < e \leq 0.35$.

In Chemical Formulas 1 and 2, although the compositions b+c and f+g of the total of manganese and chromium can be selected within a range of 0 to 1, the composition b+c is specified to be larger than 0.5, and the composition g is specified to be larger than 0.3, because when the compositions b+c and g are too small, the redox center is decreased, thereby the charge-discharge capacity declines. The composition b+c is more preferably within a range of $0.6 < b+c < 1$. Moreover, the composition f is specified to be larger than 0.2 and smaller than 0.5, because when the composition f is too small, the layer structure cannot be maintained, on the other hand, when the composition f is too large, the amount of chromium as a redox center is decreased, thereby the charge-discharge capacity declines.

In Chemical Formula 1 or 2, the composition d or h of oxygen is specified to be larger than 1.8 and smaller than 2.5, because when it is out of the range, it is difficult to form a compound having a single phase layer structure, and the crystalline structure becomes unstable, thereby resulting in a decline in battery characteristics.

The complex oxide may further include any other metal element except for lithium, manganese, chromium, titanium, magnesium and aluminum. In this case, the composition ratio of lithium to the total of metal elements except for lithium is preferably larger than 1 in molar ratio. As described above, it is because even after charge, a certain amount of lithium remains in the crystalline structure, and the stability of the crystalline structure can be maintained.

The cathode material with such a structure can be manufactured through the following steps, for example.

FIG. 1 shows a method of manufacturing the cathode material according to the embodiment of the invention. At first, as materials of lithium, manganese, chromium and at least one kind selected from the group consisting of titanium, magnesium and aluminum which are components of the above-described complex oxide, for example, lithium hydroxide (LiOH.H$_2$O), manganese carbonate (MnCO$_3$), chromium nitrate (Cr(NO$_3$)$_3$.9H$_2$O)) or chromium hydroxide (LiOH.H$_2$O), titanium oxide (TiO$_2$), magnesium hydroxide (Mg(OH)$_2$) and aluminum nitrate (Al(NO$_3$)$_3$.9H$_2$O) are prepared and weighed (step S101). In addition to the above-described materials, various kinds of carbonates, nitrates, oxalates, hydroxides or oxides may be used.

Next, these materials are mixed and pulverized in a ball mill or bead mill with ethanol or water as a dispersion medium (step S102). Next, the mixture is fired in, for example, an atmosphere of nitrogen (step S103). Thereby, the complex oxide represented by Chemical Formula 1 is obtained. In other words, less toxic ethanol or water is used as a dispersion medium, and the complex oxide is synthesized through one firing step, so the complex oxide can be easily and economically manufactured.

Such a cathode material is used for, for example, the following secondary battery.

Figure 2:
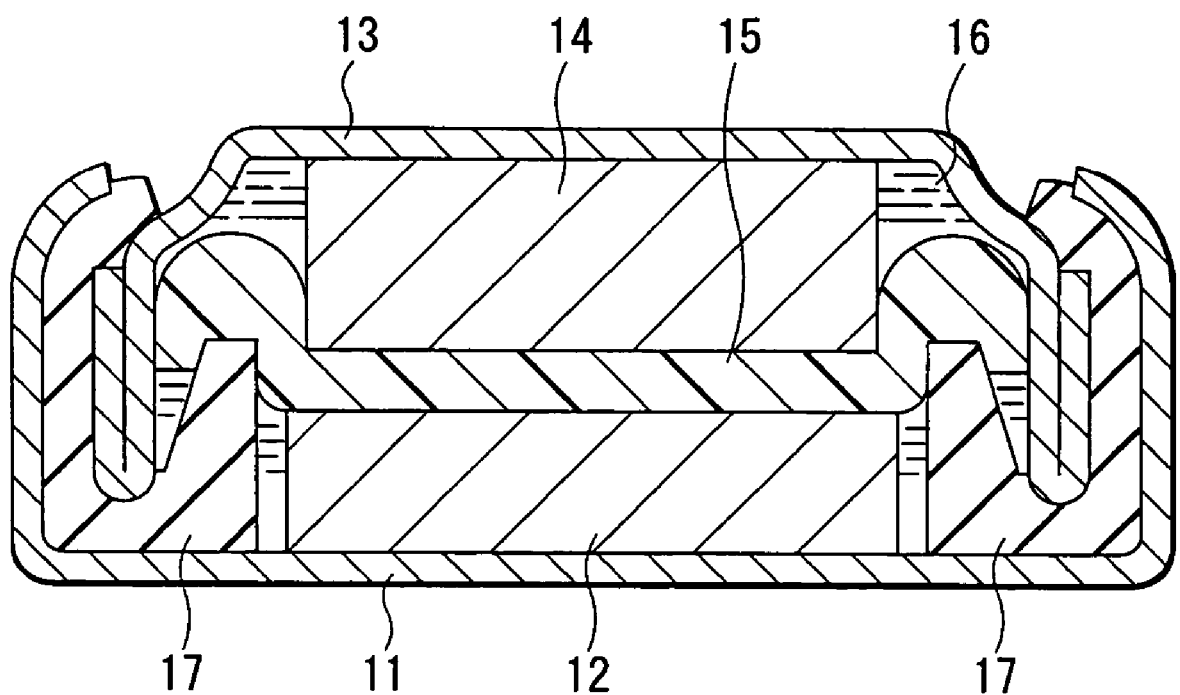
FIG. 2 is a sectional view of a secondary battery using the cathode material according to the embodiment of the invention.

FIG. 2 shows a sectional view of a secondary battery using the cathode material according to the embodiment of the invention. The secondary battery is a so-called coin type secondary battery, and comprises a disk-shaped cathode 12 contained in a package can 11 and a disk-shaped anode 14 contained in a package cup 13 which are laminated with a separator 15 in between. Interiors of the package can 11 and the package cup 13 are filled with an electrolyte solution 16 which is a liquid electrolyte, and peripheral portions of the package can 11 and the package cup 13 are sealed through caulking by an insulating gasket 17.

The package can 11 and the package cup 13 are made of, for example, metal such as stainless or aluminum. The package can 11 functions as a current collector of the cathode 12, and the package cup 13 functions as a current collector of the anode 14.

The cathode 12 includes, for example, the cathode material according to the embodiment as a cathode active material together with an electronic conductor such as carbon black or graphite and a binder such as polyvinylidene fluoride. In other words, the cathode 12 includes the above-described complex oxide. For example, after the cathode material, the electronic conductor and the binder are mixed to prepare a cathode mixture, the cathode mixture is compression molded in a pellet shape so as to form the cathode 12. Alternatively, in addition to the cathode material, the electronic conductor and the binder, a solvent such as N-methyl pyrrolidone may be added and mixed to prepare a cathode mixture, and after the cathode mixture is dried, the cathode mixture may be compression molded so as to form the cathode 12. In this case, the cathode material may be used in an as-is state or in a dried state; however, when the cathode material contacts with water, the material reacts, thereby functions as the cathode material are impaired, so it is preferable to fully dry the cathode material.

The anode 14 includes, for example, one kind or two or more kinds selected from the group consisting of lithium metal, a lithium alloy and a material capable of inserting and extracting lithium. Examples of the material capable of inserting and extracting lithium include a carbonaceous material, a metal compound, silicon, a silicon compound and an electrically conductive polymer, and one kind or a mixture of two or more kinds selected from them is used. As the carbonaceous material, graphite, non-graphitizable carbon, graphitizable carbon or the like is cited, and as the metal compound, an oxide such as SnSiO$_3$ or SnO$_2$ is cited. Further, as the electrically conductive polymer, polyacetylene, polypyrrole or the like is cited. Among them, the carbonaceous material is preferable, because a very small change in the crystalline structure occurs during charge and discharge, so a higher charge-discharge capacity and superior cycle characteristics can be obtained.

When the anode active material in a powder form is used, the anode 14 includes the material together with, for example, a binder such as polyvinylidene fluoride. In this case, after, for example, the anode active material and the binder are mixed to prepare an anode mixture, the obtained anode mixture is compression molded in a pellet shape so as to form the anode 14. Further, in addition to the material capable of inserting and extracting lithium and the binder, a solvent such as N-methyl pyrrolidone may be added and mixed to prepare an anode mixture, and after the anode mixture is dried, the anode mixture may be compression molded so as to form the anode 14.

The separator 15 isolates the cathode 12 from the anode 14 to prevent a short circuit of current due to a contact between the cathode 12 and the anode 14, and passes lithium ions therethrough. The separator 15 is made of, for example, a porous film made of a synthetic resin such as polytetrafluoroethylene, polypropylene or polyethylene, or a porous film made of an inorganic material such as a ceramic nonwoven fabric. The separator 15 may have a structure in which two or more kinds selected from the porous films are laminated.

The electrolyte solution 16 is formed through dissolving a lithium salt as an electrolyte salt in a solvent, and exhibits ionic conductivity by ionizing the lithium salt. As the lithium salt, LiPF$_6$, LiClO$_4$, LiAsF$_6$, LiBF$_4$, LiCF$_3$SO$_3$, LiN(CF$_3$SO$_2$)$_2$ or the like is suitable, and one kind or a mixture of two or more kinds selected from them is used.

As the solvent, a nonaqueous solvent such as propylene carbonate, ethylene carbonate, butylene carbonate, vinylene carbonate, γ-butyrolactone, sulfolane, 1,2-dimethoxyethane, 1,2-diethoxyethane, 2-methyltetrahydrofuran, 3-methyl-1,3-dioxolane, methyl propionate, methyl butyrate, dimethyl carbonate, diethyl carbonate or dipropyl carbonate is preferable, and one kind or a mixture of two or more kinds selected from them is used.

The secondary battery acts as follows.

When the secondary battery is charged, for example, lithium ions are extracted from the cathode 12 and precipitated on or inserted into the anode 14 through the electrolyte solution 16. When the secondary battery is discharged, for example, lithium ions are eluted or extracted from the anode 14, and inserted into the cathode 12 through the electrolyte solution 16. In this case, the cathode 12 comprises a complex oxide including at least one kind selected from the group consisting of titanium, magnesium and aluminum in addition to manganese and chromium, so a stable crystalline structure and a higher charge-discharge capacity can be obtained, and a decline in the capacity due to charge-discharge cycles is reduced. Further, the complex oxide includes an excessive amount of lithium, so the charge capacity can be improved, and a higher discharge capacity can be obtained, and even after charge, a certain amount of lithium remains in the cathode 12, so the stability of the crystalline structure of the complex oxide can be further improved, and superior charge-discharge cycle characteristics can be obtained.

Thus, the cathode material according to the embodiment comprises at least one kind selected from the group consisting of titanium, magnesium and aluminum in addition to manganese and chromium, so the crystalline structure can be stabilized, and the charge-discharge capacity and the charge-discharge cycle characteristics can be improved. Moreover, the cathode material comprises an excessive amount of lithium, so the charge capacity can be further improved, and even after charge, a certain amount of lithium remains in the cathode 12, so the stability of the crystalline structure can be further improved.

Therefore, when the cathode material is used, the secondary battery having a large charge-discharge capacity and superior charge-discharge cycle characteristics can be obtained.

More specifically, the complex oxide represented by Chemical Formula 1 or 2 is included, higher effects can be obtained.

Moreover, in the method of manufacturing the cathode material according to the embodiment, when the materials are mixed, less toxic ethanol or water is used as a dispersion medium, so the cathode material according to the embodiment can be easily and economically manufactured.

EXAMPLES

Next, specific examples of the invention will be described in detail below.

Examples 1-1 through 1-3

At first, as materials, lithium hydroxide monohydrate, manganese carbonate, chromium nitrate nonahydrate and aluminum nitrate nonahydrate were prepared and weighed so as to have a composition molar ratio different in each of Examples 1-1 through 1-3 as shown in Table 1 (refer to step S101 in FIG. 1). Next, these materials were pulverized and mixed using ethanol as a dispersion medium in a ball mill (refer to step S102 in FIG. 1). Then, the obtained mixture was fired for 24 hours at 650° C. in an atmosphere of nitrogen (refer to step S103 in FIG. 1). Thereby, as the cathode material, a complex oxide $Li_aMn_bCr_cAl_{1-b-c}O_d$ with a composition shown in Table 1 was synthesized.

Figure 3:
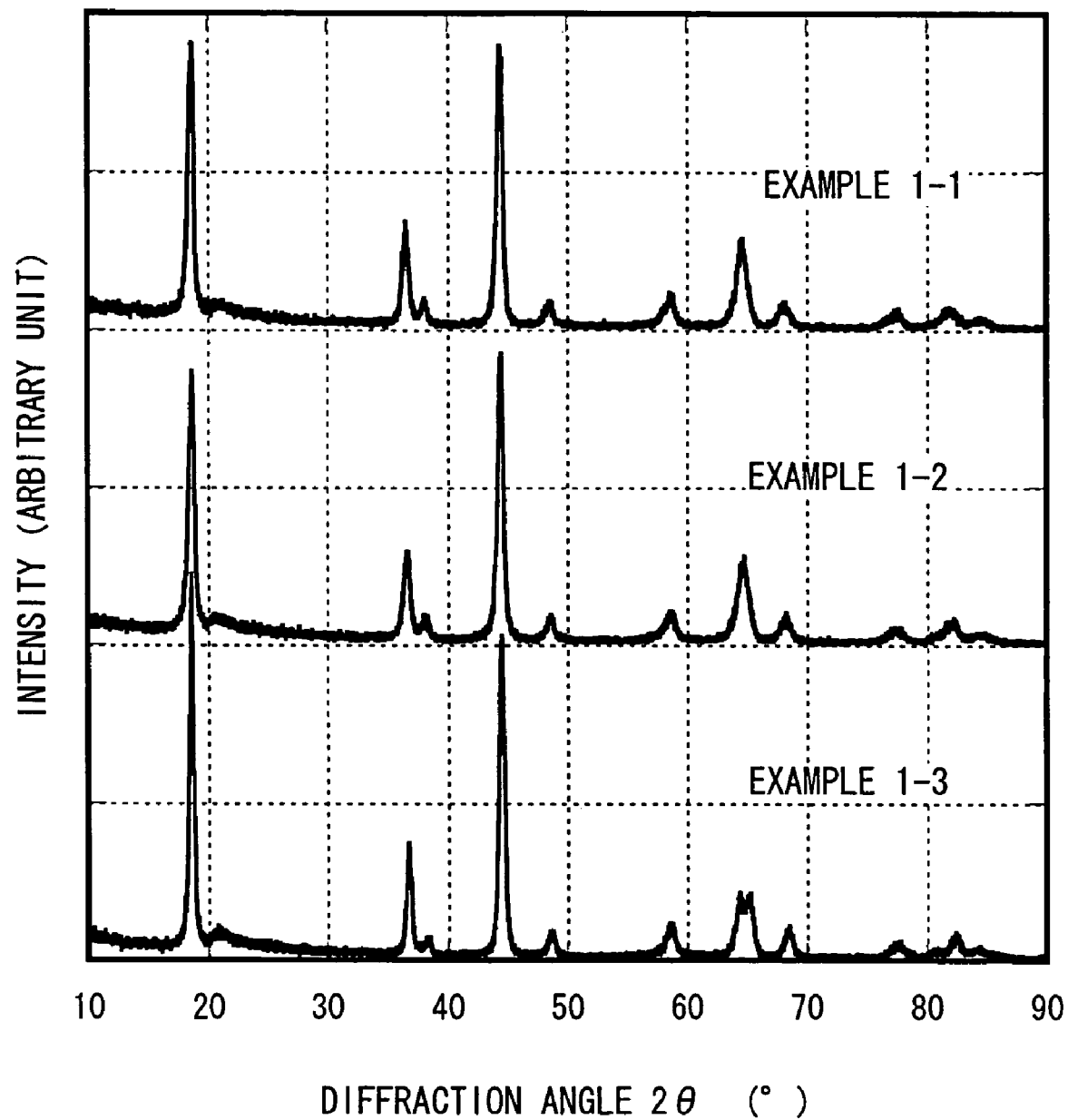
FIG. 3 is a plot showing X-ray diffraction patterns of cathode materials in Examples 1-1 through 1-3.

FIG. 3 shows the X-ray diffraction patterns. It was found out from FIG. 3 that the obtained complex oxides of Examples 1-1 through 1-3 were $Li_aMn_bCr_cAl_{1-b-c}O_d$ with a layer structure. Moreover, in Examples 1-1 through 1-3, peaks indicating impurities were slightly observed at approximately 21°.

Further, a coin-type battery shown in FIG. 2 was formed by using each of the complex oxides of Examples 1-1 through 1-3, and the charge-discharge characteristics of each battery were examined to evaluate the characteristics of the cathode material.

The cathode 12 of the battery was formed through the following steps. Firstly, the synthesized complex oxide was dried, and 60 mg of the complex oxide as the cathode material was kneaded with acetylene black as an electronic conductor, and polyvinylidene fluoride as a binder by using N-methyl-2-pyrrolidone as a solvent to form a paste-form cathode mixture. A ratio of the cathode material, acetylene black and polyvinylidene fluoride was 85 wt % of the cathode material, 10 wt % of acetylene black and 5 wt % of polyvinylidene fluoride. Next, the cathode mixture was palletized together with a mesh current collector made of aluminum, and was dried at 100° C. for 1 hour in a dry argon (Ar) airflow to form the cathode 12.

A lithium metal plate stamped into a disk shape was used as the anode 14, and a porous film made of polypropylene was used as the separator 15, and a mixed solvent of ethylene carbonate and dimethyl carbobate in a volume ratio of 1:1 in which $LiPF_6$ was dissolved as a lithium salt in a concentration of 1 mol/l was used as the electrolyte solution 16. The battery had a diameter of 20 mm and a height of 1.6 mm.

TABLE 1

| | COMPOSITION MOLAR RATIO OF MATERIALS | | | | |
| --- | --- | --- | --- | --- | --- |
| | LiOH· $H_2O$ | $MnCO_3$ | $Cr(NO_3)_3$· $9H_2O$ | $Al(NO_3)_3$· $9H_2O$ | COMPOSITION OF COMPLEX OXIDE |
| EXAMPLE 1-1 | 1.5 | 0.45 | 0.45 | 0.1 | $Li_{1.5}Mn_{0.45}Cr_{0.45}Al_{0.1}O_2$ |
| EXAMPLE 1-2 | 1.5 | 0.5 | 0.4 | 0.1 | $Li_{1.5}Mn_{0.5}Cr_{0.4}Al_{0.1}O_2$ |
| EXAMPLE 1-3 | 1.5 | 0.5 | 0.3 | 0.2 | $Li_{1.5}Mn_{0.5}Cr_{0.3}Al_{0.2}O_2$ |
| COMPARATIVE EXAMPLE 1-1 | 1.5 | 0.5 | 0.5 | 0 | $Li_{1.5}Mn_{0.5}Cr_{0.5}O_2$ |

The powder X-ray diffraction patterns of the obtained complex oxides in Examples 1-1 through 1-3 were measured by using a rotating anode type X-ray diffractometer Rigaku-RINT2500. The X-ray diffractometer comprised an upright goniometer with a radius of 185 mm. In the X-ray diffractometer, X-rays were converted into monochrome by a combination of a multichannel analyzer and a counter monochromator without using a filter such as a K β filter, and a specific X-ray was detected by a scintillation counter. The measurement was carried out by using CuK α (40 KV, 100 mA) as the specific X-ray. On the condition that both of an incident angle DS with a sample surface and an angle RS of a diffraction line with the sample surface were 1°, and a width SS of an entrance slit was 0.15 mm, the measurement was carried out by a reflection method through continuous scanning (scanning range 2 θ=from 10° to 80°, scanning speed 4°/min).

Moreover, charge-discharge was performed as follows. At first, after a constant current charge was performed until the battery voltage reached 4.5 V at a constant current, a constant voltage charge was performed until the current became 0.05 mA/cm² or less at a constant voltage of 4.5 V. Next, a constant current discharge was performed until the battery voltage reached 2.5 V at a constant current. At that time, the charge-discharge cycle was performed at room temperature (23° C.).

Figure 4:
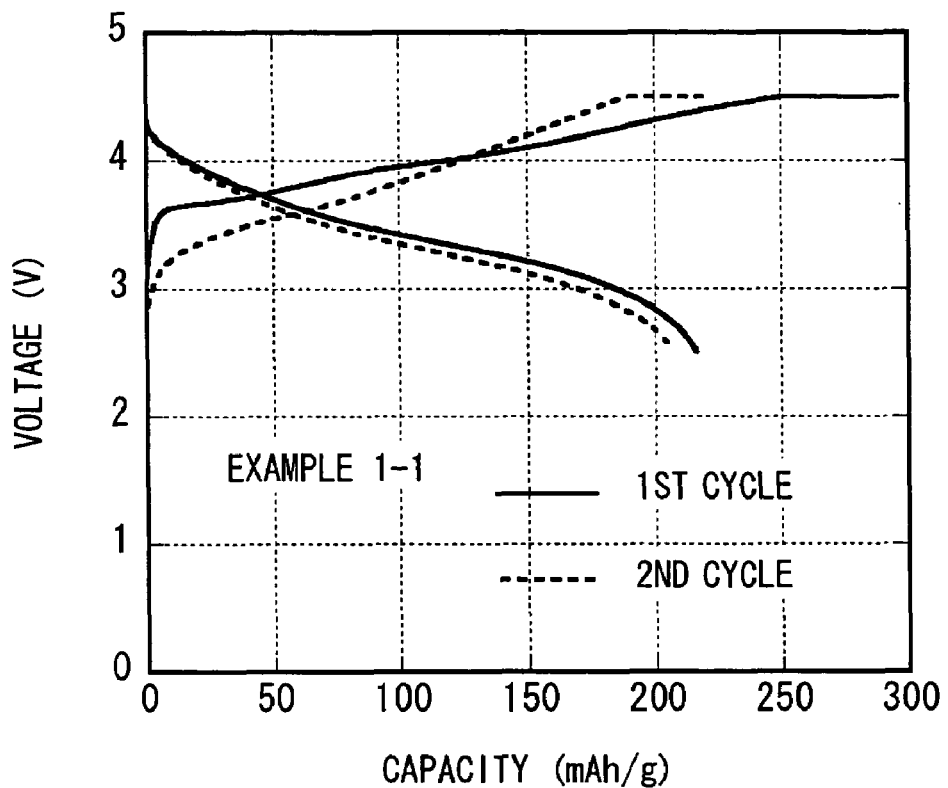
FIG. 4 is a plot showing charge-discharge curves in Example 1-1.
Figure 5:
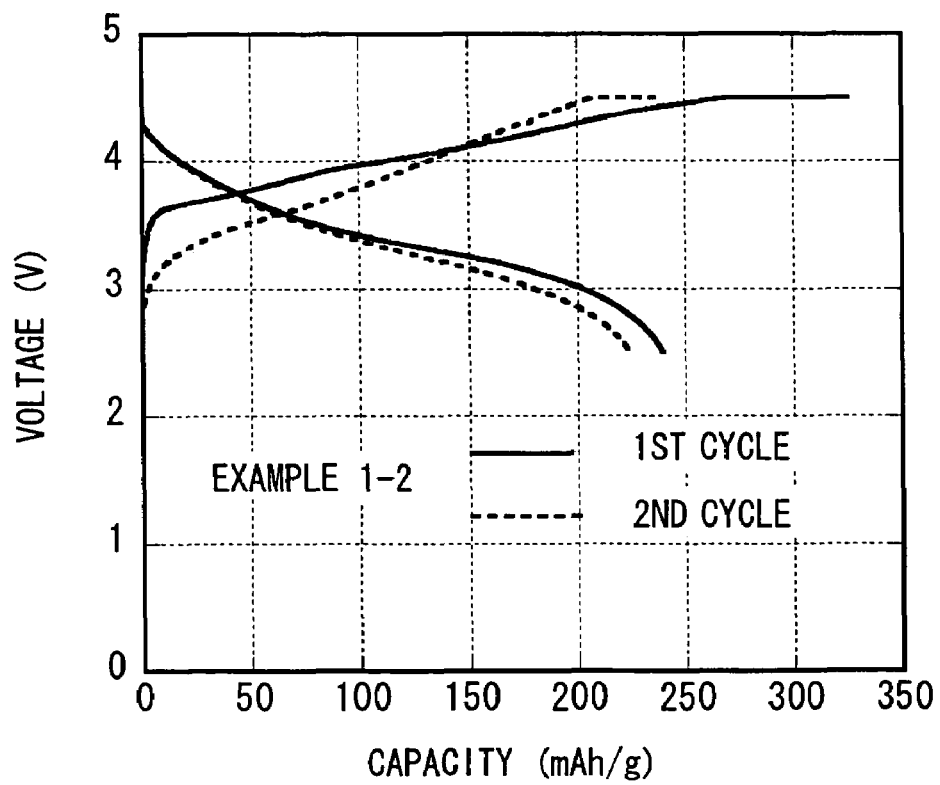
FIG. 5 is a plot showing charge-discharge curves in Example 1-2.
Figure 6:
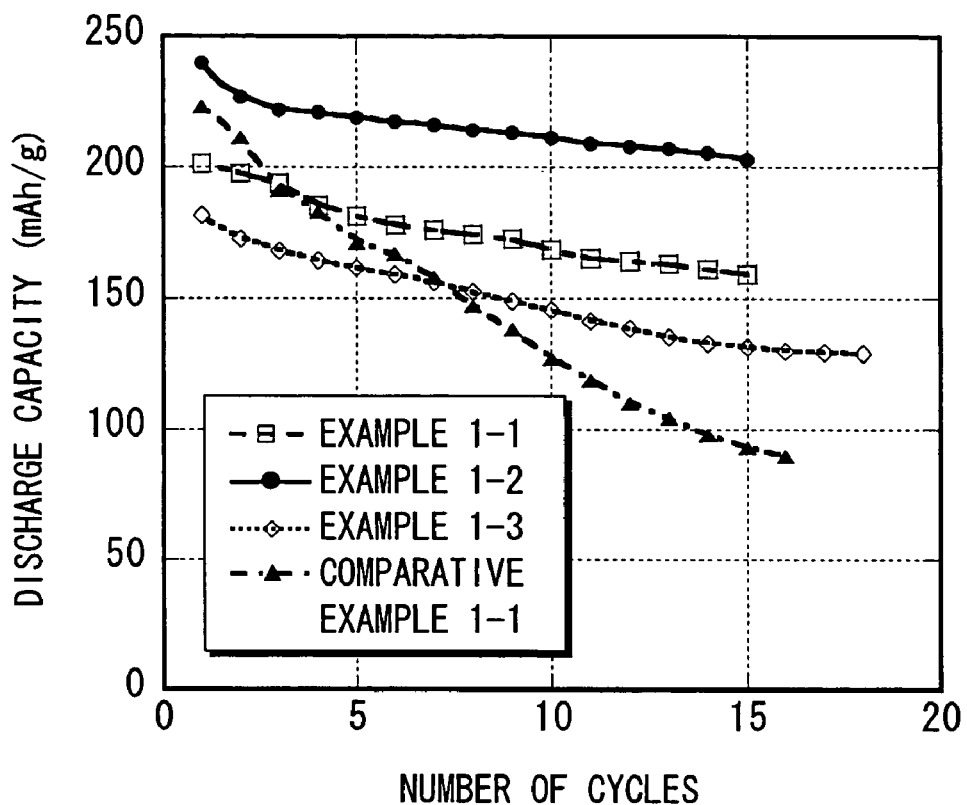
FIG. 6 is a plot showing a relationship between a discharge capacity and the number of cycles in Examples 1-1 through 1-3 and Comparative Example 1-1.

FIG. 4 shows charge-discharge curves in Example 1-1 as a representative, and FIG. 5 shows charge-discharge curves in Example 1-2 as a representative. FIG. 6 shows changes in discharge capacity by the number of cycles in Examples 1-1 through 1-3. Further, Table 2 shows charge capacities and discharge capacities of Examples 1-1 through 1-3 in the first cycle.

TABLE 2

|  | CHARGE CAPACITY (mAh/g) | DISCHARGE CAPACITY (mAh/g) |
|---|---|---|
| EXAMPLE 1-1 | 303 | 216 |
| EXAMPLE 1-2 | 325 | 239 |
| EXAMPLE 1-3 | 281 | 181 |
| COMPARATIVE EXAMPLE 1-1 | 296 | 223 |

As Comparative Example 1-1 relative to Examples 1-1 through 1-3, a complex oxide $Li_{1.5}Mn_{0.5}Cr_{0.5}O_2$ with a composition shown in Table 1 was synthesized as in the case of Examples 1-1 through 1-3, except that the composition molar ratio of materials was changed as shown in Table 1. The complex oxide of Comparative Example 1-1 included no aluminum.

Figure 7:
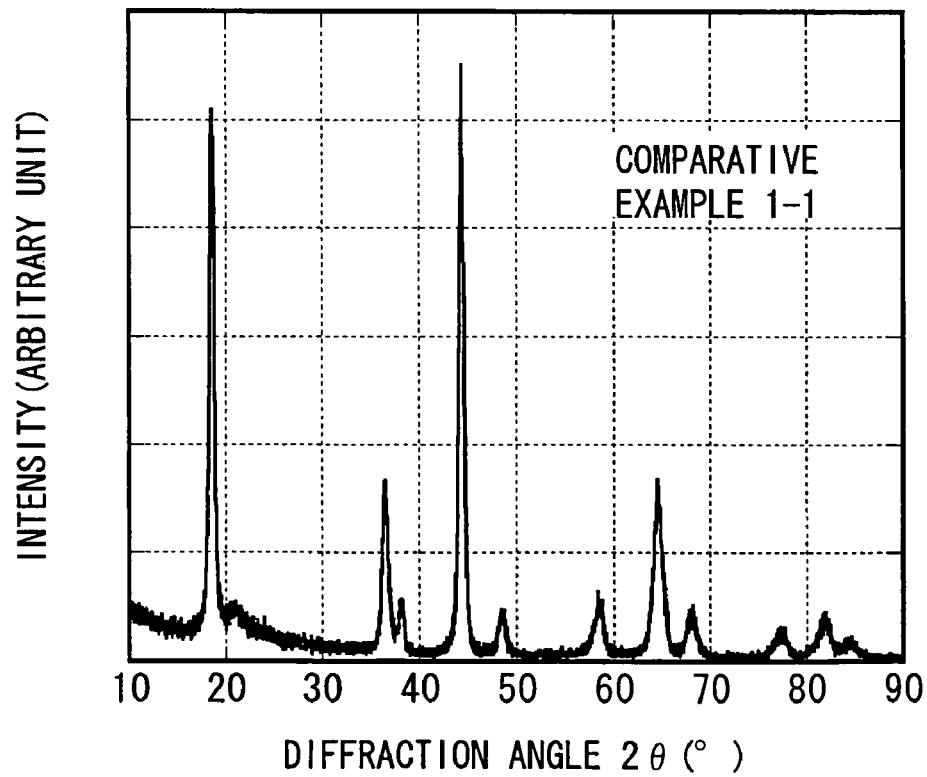
FIG. 7 is a plot showing an X-ray diffraction pattern of a cathode material in Comparative Example 1-1.

The powder X-ray diffraction pattern of the complex oxide in Comparative Example 1-1 was measured as in the case of Examples 1-1 through 1-3. FIG. 7 shows the X-ray diffraction pattern. It was found out from FIG. 7 that the complex oxide of Comparative Example 1-1 was $Li_{1.5}Mn_{0.5}Cr0.5O_2$ with a layer structure. In Comparative Example 1-1, peaks indicating impurities were slightly observed at approximately 21° as in the case of Examples 1-1 through 1-3.

Figure 8:
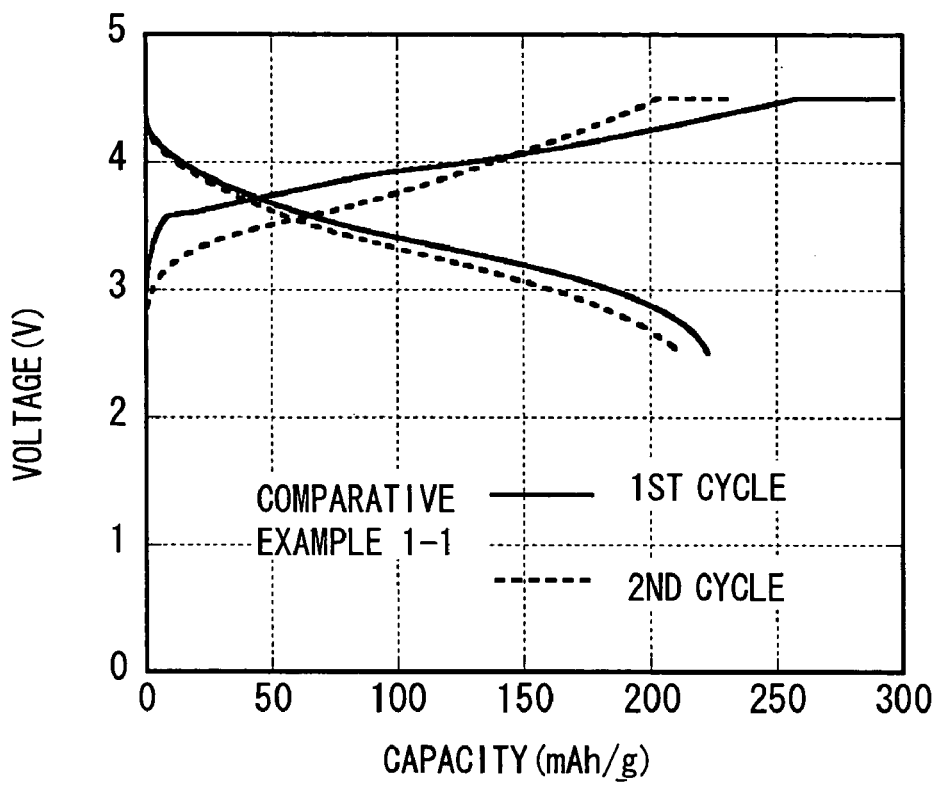
FIG. 8 is a plot showing charge-discharge curves in Comparative Example 1-1.

Moreover, the coin type battery was formed by using the complex oxide of Comparative Example 1-1 as in the case of Examples 1-1 through 1-3, and the characteristics thereof were evaluated in the same manner. FIG. 8 shows charge-discharge curves thereof, and FIG. 6 shows changes in discharge capacity by the number of cycles in Comparative Example 1-1 together with the results of Examples 1-1 through 1-3. Further, Table 2 shows a charge capacity and a discharge capacity in the first cycle in Comparative Example 1-1 together with the results of Examples 1-1 through 1-3.

As shown in FIG. 6, in Examples 1-1 through 1-3 in which aluminum was included, superior charge-discharge cycle characteristics were obtained, compared to Comparative Example 1-1 in which no aluminum was included. In other words, it was found out that when aluminum was included in addition to manganese and chromium, the crystalline structure could be stabilized, and the charge-discharge cycle characteristics could be improved.

Examples 1-4 through 1-6

As Examples 1-4 through 1-6, complex oxides $Li_aMn_bCr_cAl_{1-b-c}O_d$ with a composition shown in Table 3 were synthesized as in the case of Example 1-2, except that a composition molar ratio of materials was changed as shown in Table 3, and coin-type batteries using the complex oxides were formed. The complex oxides of Examples 1-4 through 1-6 were equivalent to that of Example 1-2, except that the composition a of lithium was changed.

TABLE 3

|  | COMPOSITION MOLAR RATIO OF MATERIALS | | | | |
|---|---|---|---|---|---|
|  | LiOH. $H_2O$ | $MnCO_3$ | $Cr(NO_3)_3 \cdot 9H_2O$ | $Al(NO_3)_3 \cdot 9H_2O$ | COMPOSITION OF COMPLEX OXIDE |
| EXAMPLE 1-4 | 1.2 | 0.5 | 0.4 | 0.1 | $Li_{1.2}Mn_{0.5}Cr_{0.4}Al_{0.1}O_2$ |
| EXAMPLE 1-5 | 1.4 | 0.5 | 0.4 | 0.1 | $Li_{1.4}Mn_{0.5}Cr_{0.4}Al_{0.1}O_2$ |
| EXAMPLE 1-2 | 1.5 | 0.5 | 0.4 | 0.1 | $Li_{1.5}Mn_{0.5}Cr_{0.4}Al_{0.1}O_2$ |
| EXAMPLE 1-6 | 1.55 | 0.5 | 0.4 | 0.1 | $Li_{1.55}Mn_{0.5}Cr_{0.4}Al_{0.1}O_2$ |
| COMPARATIVE EXAMPLE 1-2 | 1.0 | 0.5 | 0.4 | 0.1 | $Li_{1.0}Mn_{0.5}Cr_{0.4}Al_{0.1}O_2$ |
| COMPARATIVE EXAMPLE 1-3 | 1.6 | 0.5 | 0.4 | 0.1 | $Li_{0.6}Mn_{0.5}Cr_{0.4}Al_{0.1}O_2$ |

As Comparative Examples 1-2 and 1-3 relative to Examples 1-2 and 1-4 through 1-6, complex oxides $Li_aMn_bCr_cAl_{1-b-c}O_d$ with a composition shown in Table 3 were synthesized as in the case of Example 1-2, except that the composition molar ratio of materials was changed as shown in Table 3, and coin-type batteries using the complex oxides were formed. The complex oxides were equivalent to that of Example 1-2, except that in Comparative Example 1-2, the composition a of lithium was 1.0, and in Comparative Example 1-3, the composition a of lithium was 1.6.

Figure 9:
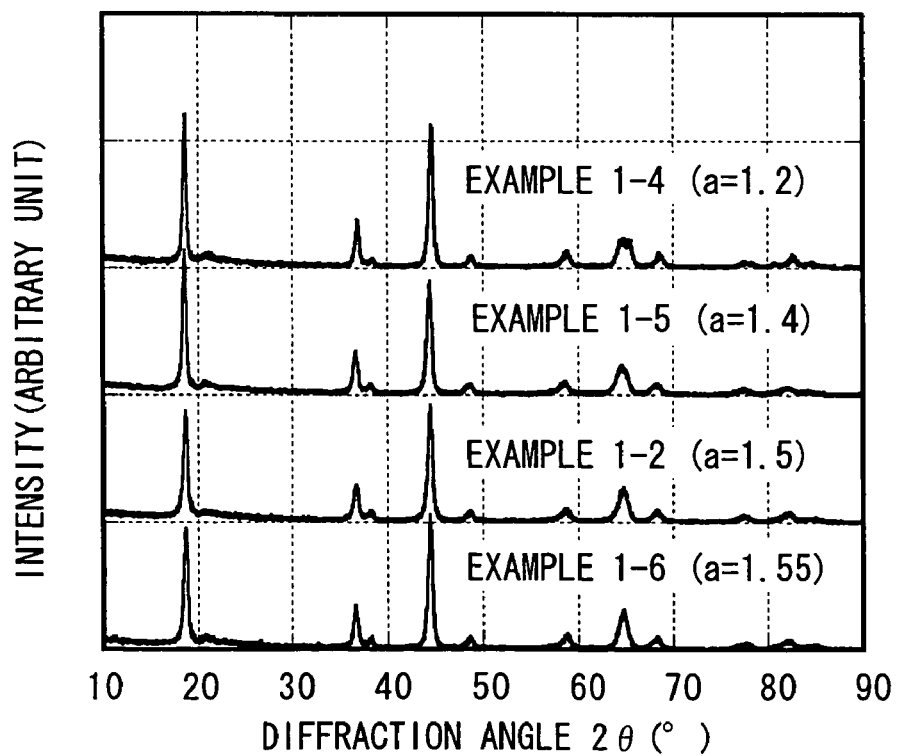
FIG. 9 is a plot showing X-ray diffraction patterns of cathode materials in Examples 1-2, 1-4 through 1-6.
Figure 10:
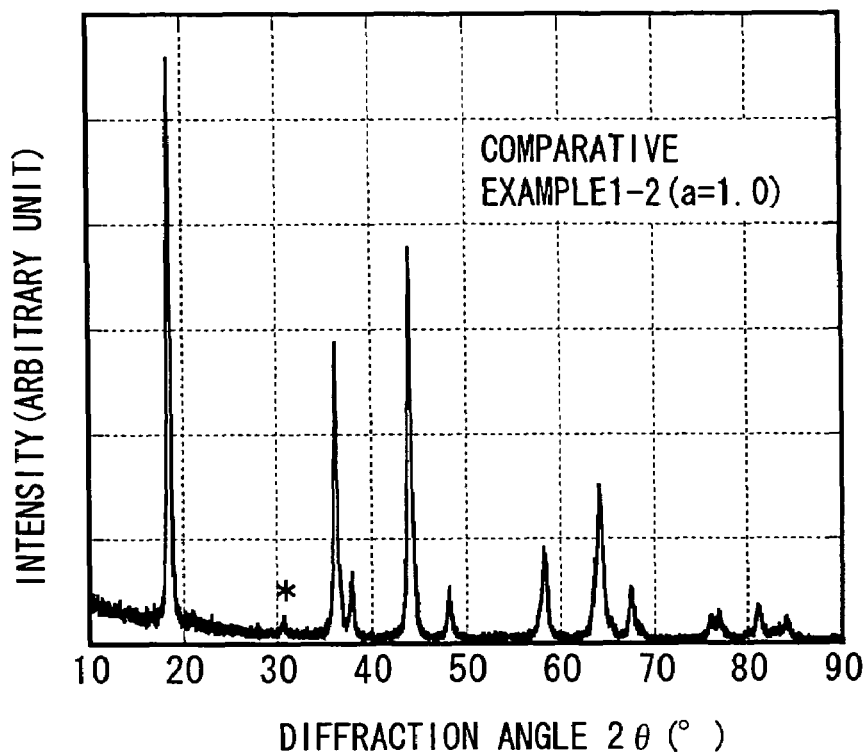
FIG. 10 is a plot showing an X-ray diffraction pattern of a cathode material in Comparative Example 1-2.
Figure 11:
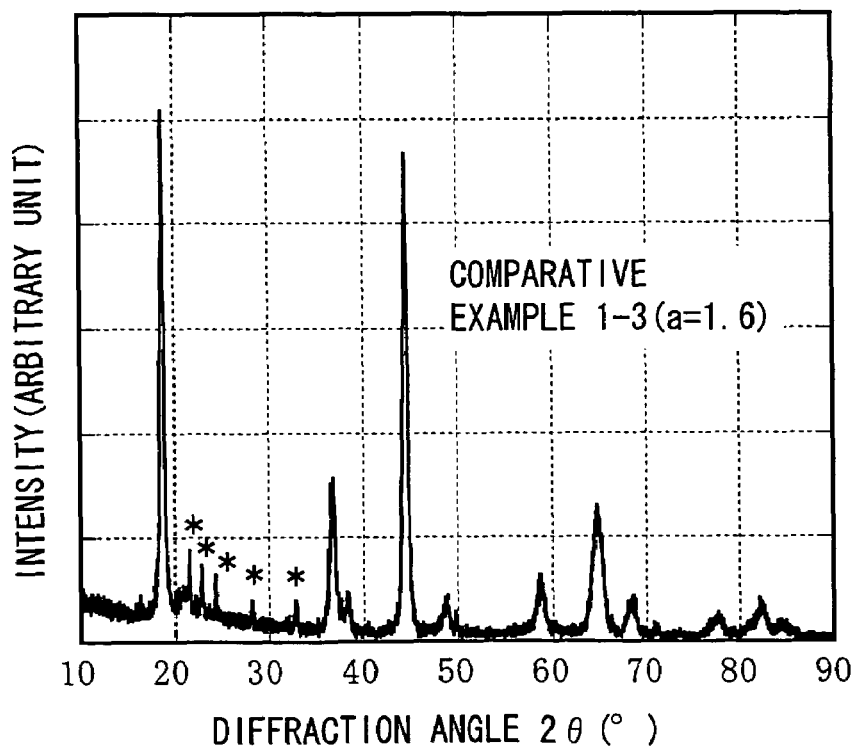
FIG. 11 is a plot showing an X-ray diffraction pattern of a cathode material in Comparative Example 1-3.
Figure 12:
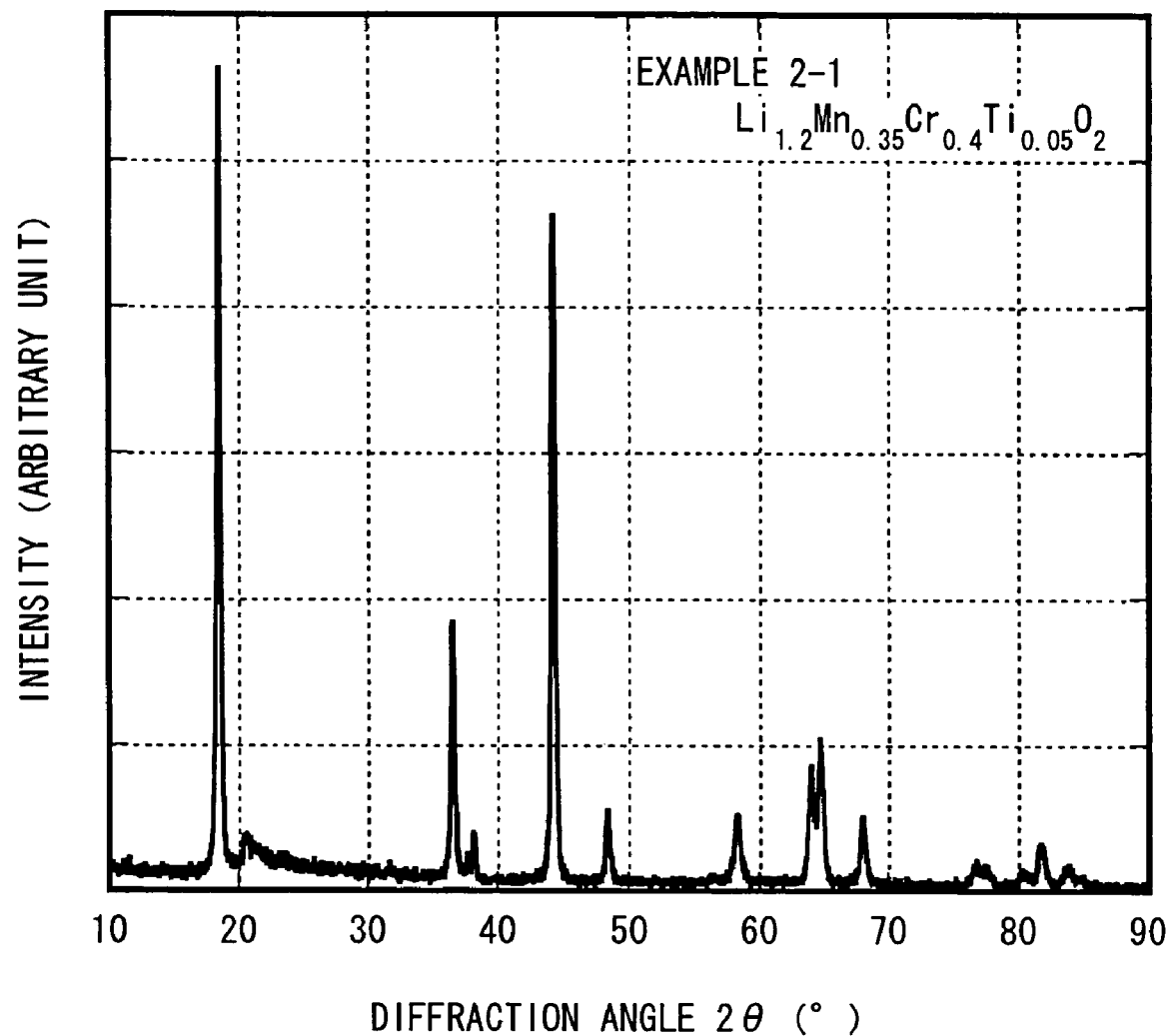
FIG. 12 is a plot showing an X-ray diffraction pattern of a cathode material in Example 2-1.
Figure 13:
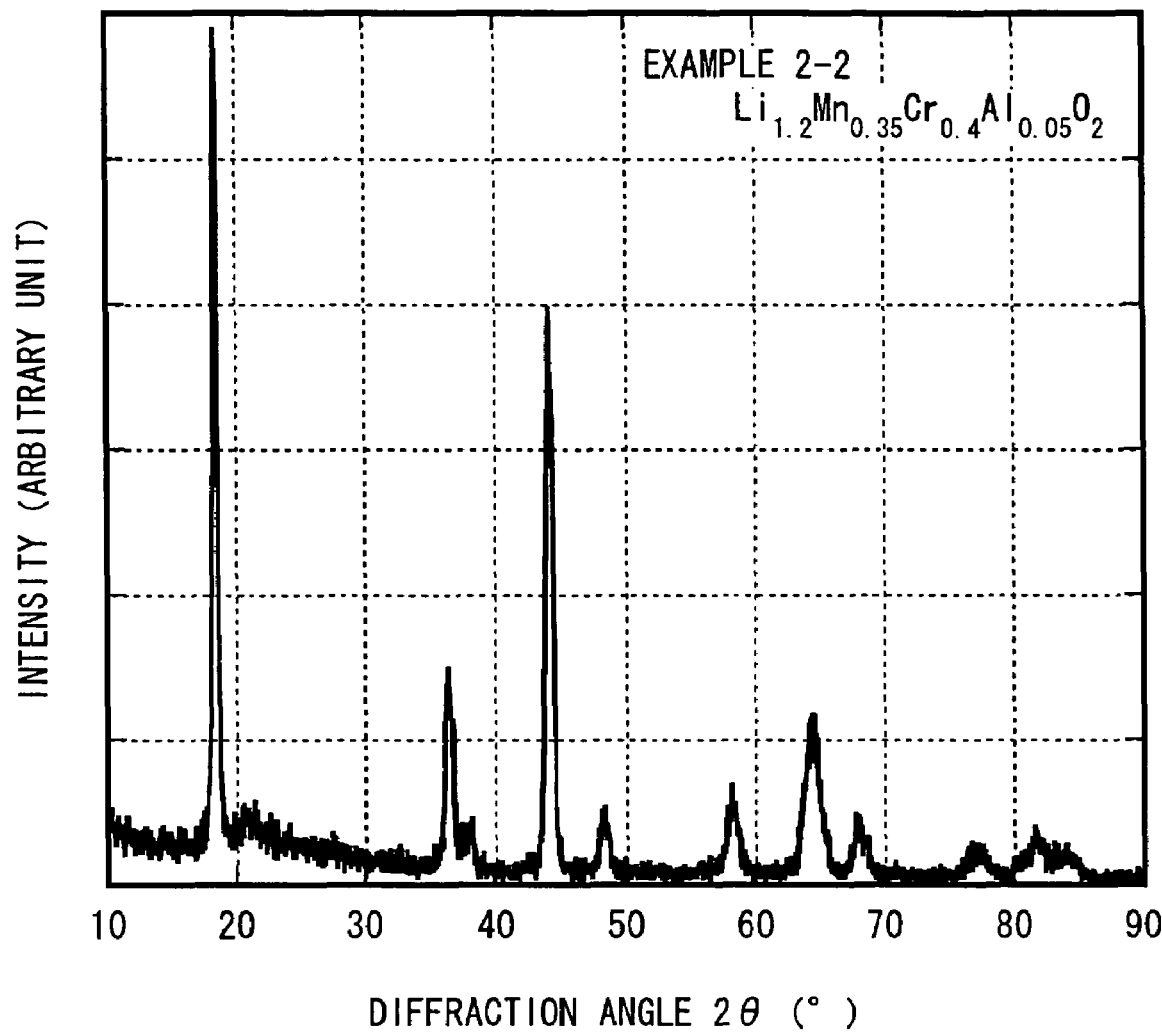
FIG. 13 is a plot showing an X-ray diffraction pattern of a cathode material in Example 2-2.
Figure 14:
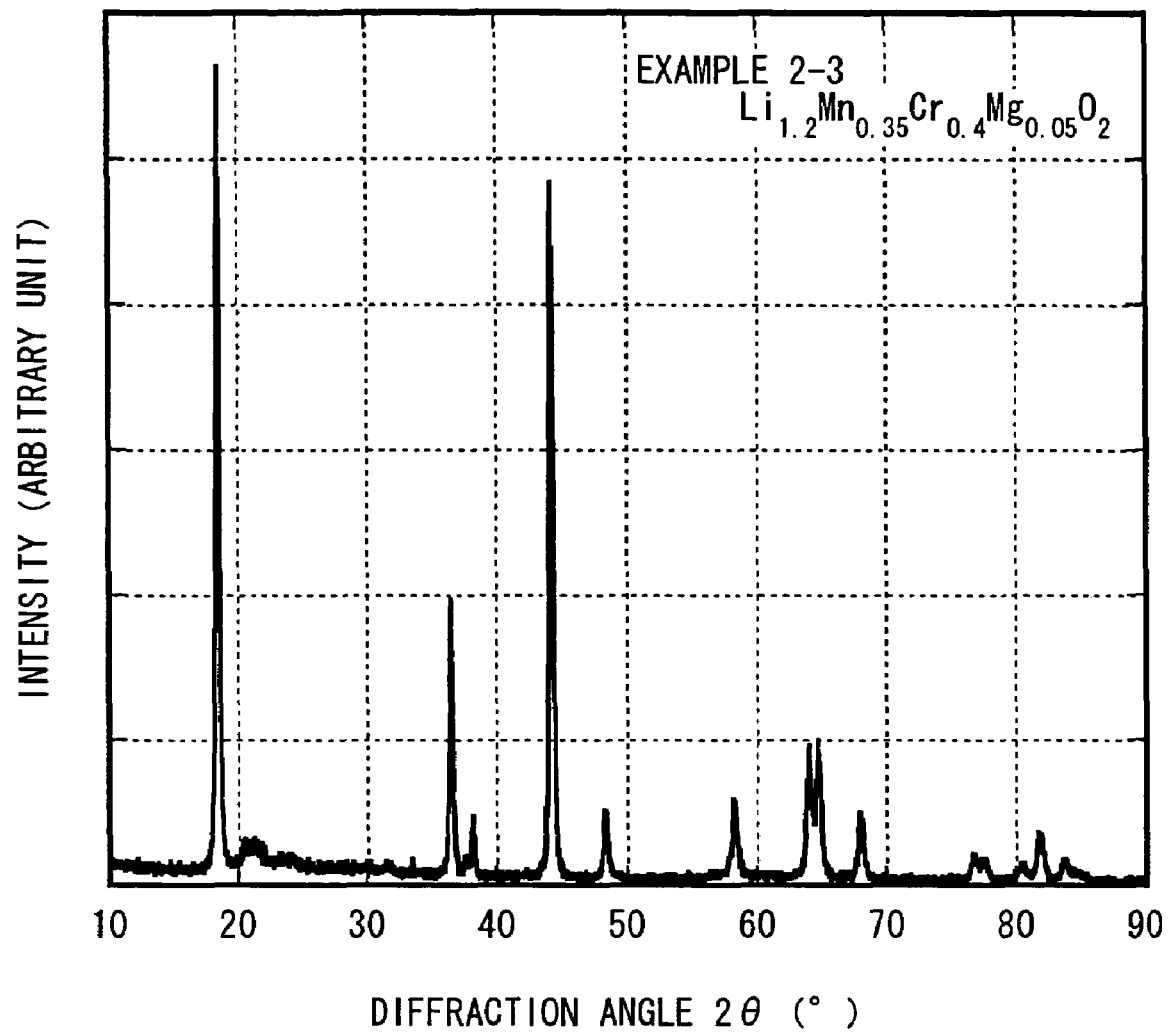
FIG. 14 is a plot showing an X-ray diffraction pattern of a cathode material in Example 2-3.
Figure 15:
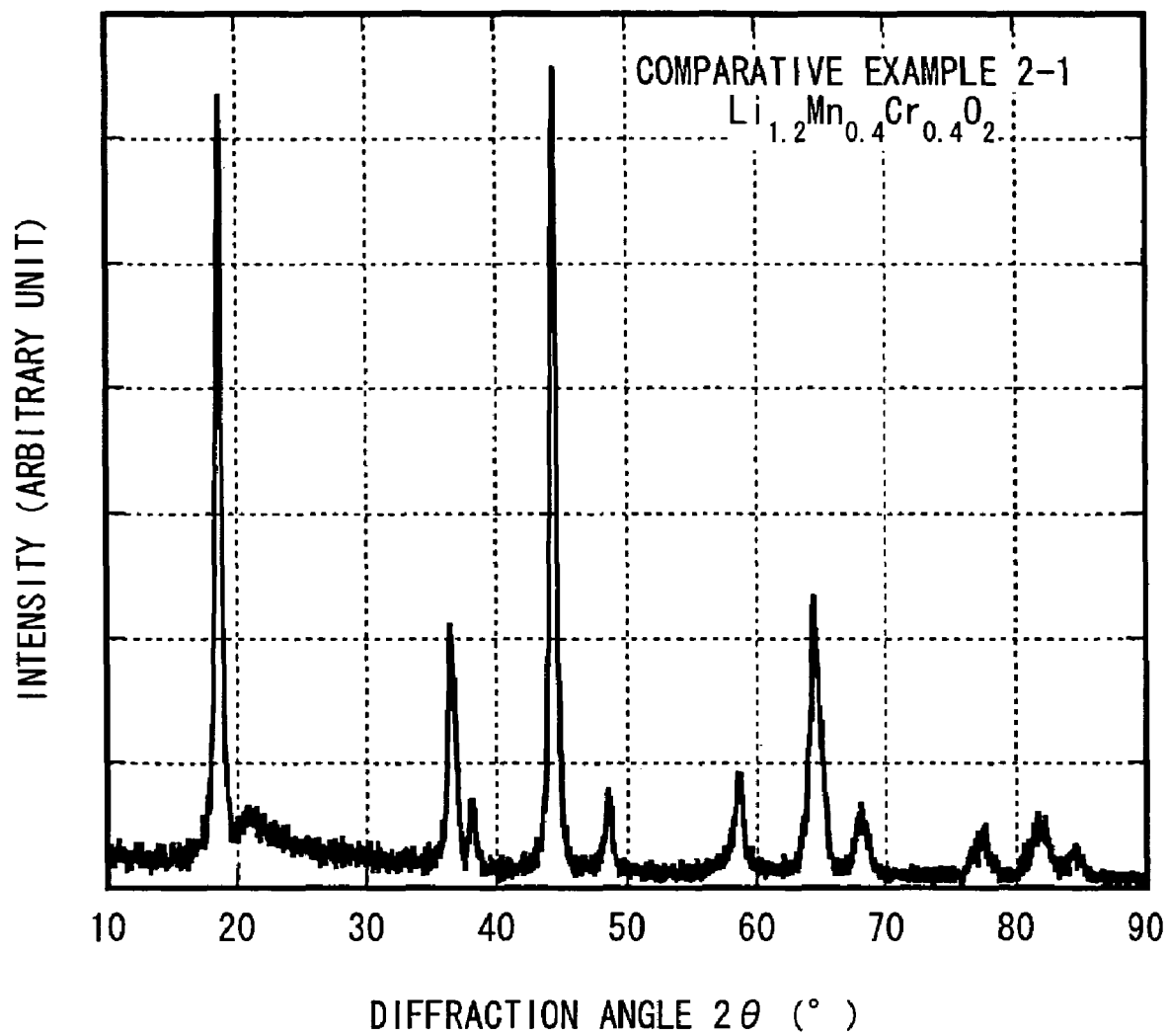
FIG. 15 is a plot showing an X-ray diffraction pattern of a cathode material in Comparative Example 2-1.
Figure 16:
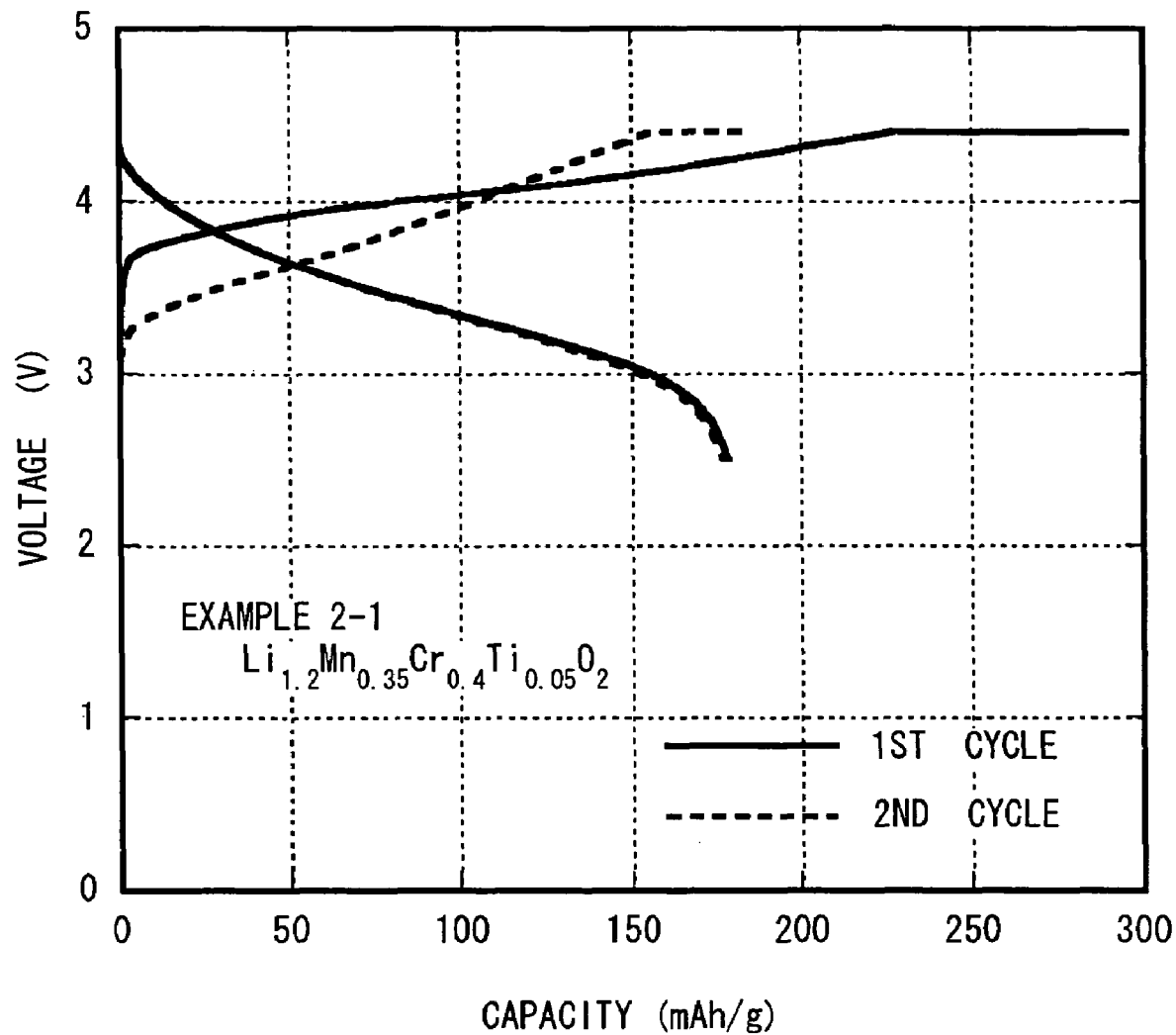
FIG. 16 is a plot showing charge-discharge curves in Example 2-1.
Figure 17:
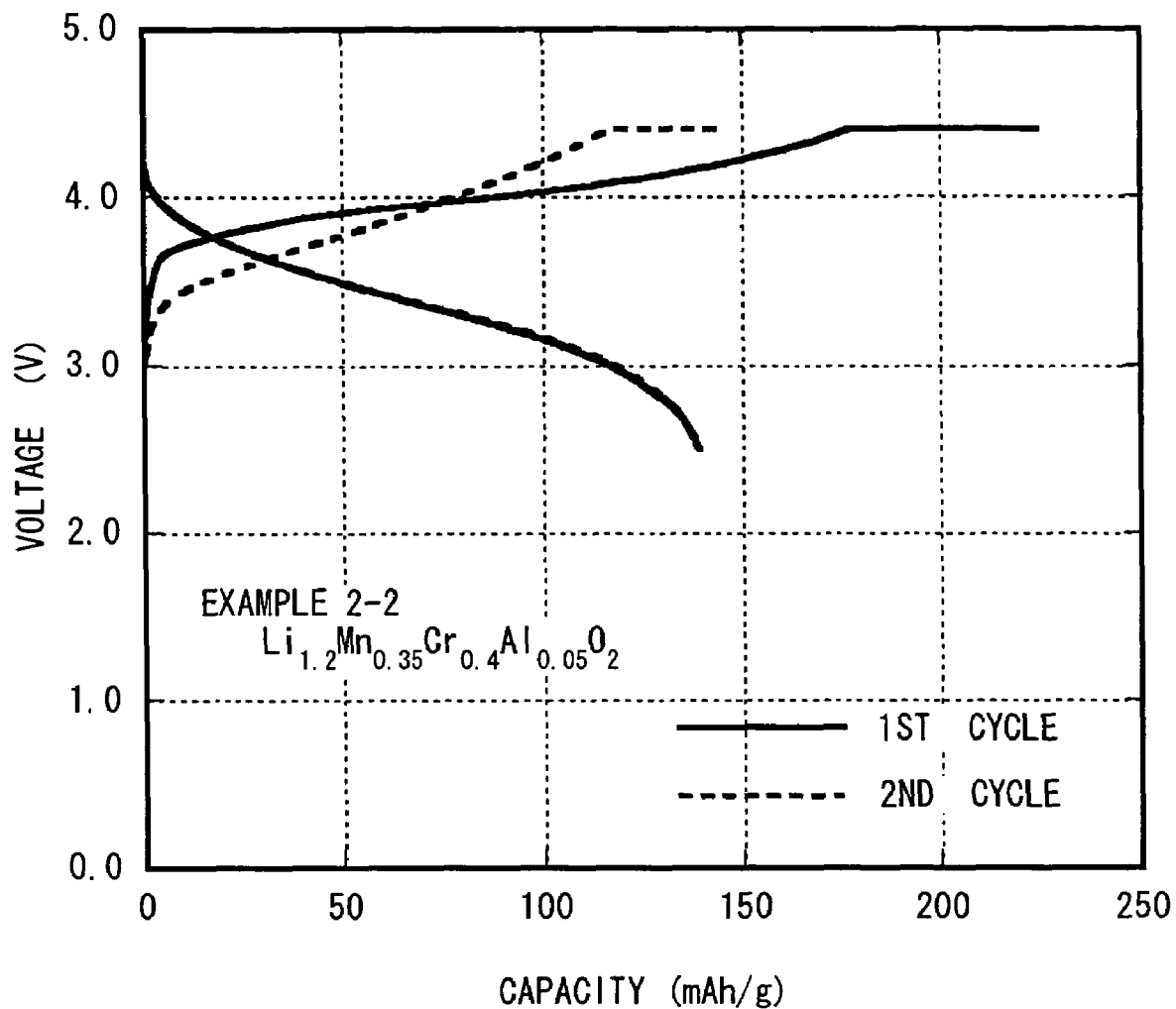
FIG. 17 is a plot showing charge-discharge curves in Example 2-2.
Figure 18:
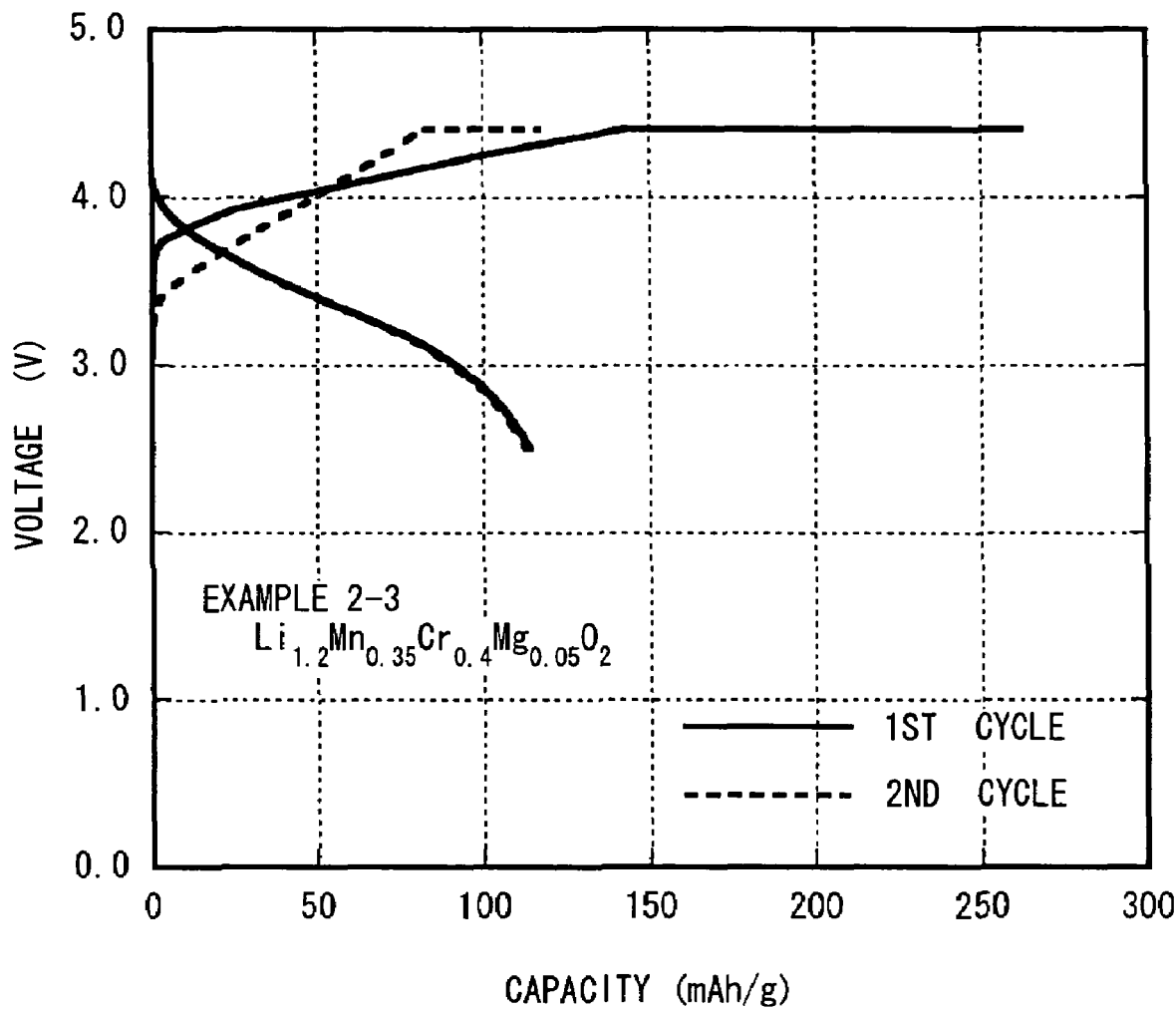
FIG. 18 is a plot showing charge-discharge curves in Example 2-3.
Figure 19:
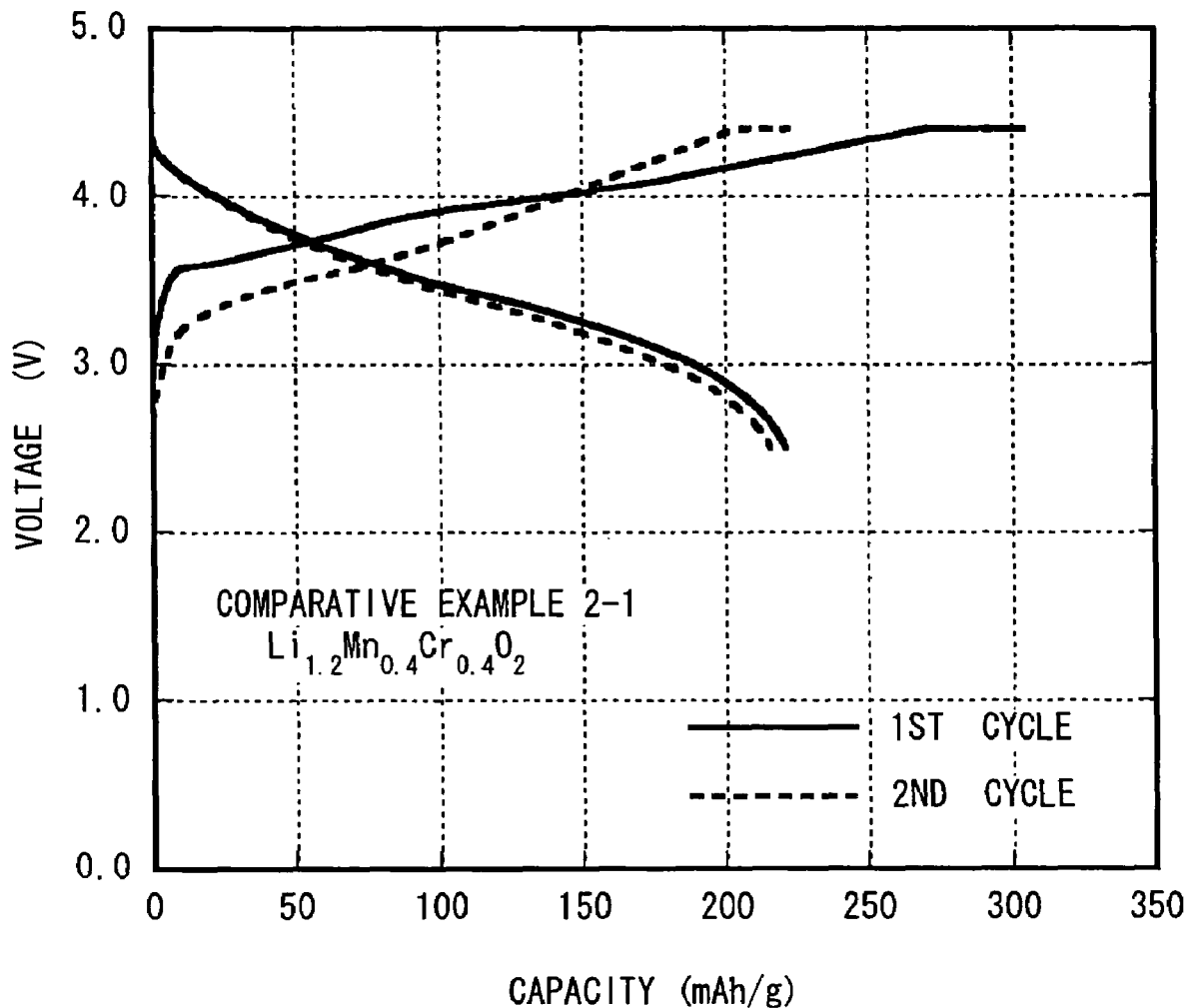
FIG. 19 is a plot showing charge-discharge curves in Comparative Example 2-1.

The powder X-ray diffraction patterns of the complex oxides in Examples 1-4 through 1-6 and Comparative Examples 1-2 and 1-3 were measured as in the case of Example 1-2. FIG. 9 shows the X-ray diffraction patterns of Examples 1-4 through 1-6 together with the result of Example 1-2. FIG. 10 shows the X-ray diffraction pattern of Example 1-2, and FIG. 11 shows the X-ray diffraction pattern of Example 1-3.

It was found out from FIG. 9 that the complex oxides of Examples 1-4 through 1-6 were $Li_aMn_bCr_cAl_{1-b-c}O_d$ with a layer structure as in the case of Example 1-2. In Examples 1-4 through 1-6, peaks indicating impurities were slightly observed at approximately 21°. On the other hand, it was found out from FIGS. 10 and 11 that the obtained complex oxides of Comparative Example 1-2 and 1-3 mainly included $Li_aMn_bCr_cAl_{1-b-c}O_d$ with a layer structure, and peaks indicating impurities were observed. In FIGS. 10 and 11, peaks indicating impurities were marked with asterisks. As a result, it was found out that in Comparative Examples 1-2 and 1-3, more impurities were included, compared to Examples 1-2 and 1-4 through 1-6.

Moreover, the characteristics of the batteries of Examples 1-4 through 1-6 and Comparative Examples 1-2 and 1-3 were evaluated as in the case of Example 1-2. Table 4 shows charge capacities and discharge capacities in the first cycle together with the result of Example 1-2.

TABLE 4

|  | CHARGE CAPACITY (mAh/g) | DISCHARGE CAPACITY (mAh/g) |
| --- | --- | --- |
| EXAMPLE 1-4 | 220 | 140 |
| EXAMPLE 1-5 | 275 | 190 |
| EXAMPLE 1-2 | 325 | 239 |
| EXAMPLE 1-6 | 302 | 210 |
| COMPARATIVE EXAMPLE 1-2 | 164 | 137 |
| COMPARATIVE EXAMPLE 1-3 | 131 | 114 |

As shown in Table 4, in Examples 1-2 and 1-4 through 1-6, a larger charge capacity and a larger discharge capacity were obtained, compared to Comparative Example 1-2 in which the composition a of lithium was 1.0 and Comparative Example 1-3 in which the composition a of lithium was 1.6. In other words, it was found out that when the composition a of lithium was within a range of larger than 1.0 and smaller than 1.6, the charge capacity and the discharge capacity could be increased.

Moreover, it was found out from the results of Examples 1-2 and 1-4 through 1-6 that there was a tendency that as the composition a of lithium increased, the discharge capacity increased until reaching the maximum value when the composition a was approximately 1.5, then the discharge capacity decreased. In other words, it was found out that when the composition a of lithium was within a range of $1.1 < a \leq 1.55$, a larger discharge capacity could be obtained.

Examples 2-1 through 2-3

As Examples 2-1 through 2-3, complex oxides $Li_{1+e}(Mn_f Cr_g M_{1-f-g})_{1-e}O_h$ with a composition shown in Table 5 were synthesized as in the case of Examples 1-1 through 1-3, except that the composition molar ratio of materials was changed as shown in Table 5, and materials were mixed with water as a dispersion medium in a bead mill, and were fired at 800° C. for 24 hours, and coin-type batteries using the complex oxides were formed. In Example 2-1, titanium was added, and in Example 2-2, aluminum was added, and in Example 2-3, magnesium was added.

As Comparative Example 2-1 relative to Examples 2-1 through 2-3, a complex oxide $Li_{1+e}(Mn_f Cr_g M_{1-f-g})_{1-e}O_h$ with a composition shown in Table 5 was synthesized as in the case of Examples 2-1 through 2-3, except that the composition molar ratio of materials was changed as shown in Table 5, and a coin-type battery using the complex oxide was formed. In Comparative Example 2-1, titanium, aluminum and magnesium were not included.

The powder X-ray diffraction patterns of the complex oxides in Examples 2-1 through 2-3 and Comparative Example 2-1 were measured as in the case of Examples 1-1 through 1-3. FIGS. 12, 13, 14 and 15 show the X-ray diffraction patterns of Example 2-1, Example 2-2, Example 2-3 and Comparative Example 2-1, respectively.

It was found out from FIGS. 12 through 15 that the obtained complex oxides of Examples 2-1 through 2-3 and Comparative Example 2-1 had a layer structure. In Examples 2-1 through 2-3 and Comparative Example 2-1, peaks indicating impurities were slightly observed at approximately 21°.

Moreover, the batteries of Examples 2-1 through 2-3 and Comparative Example 2-1 were charged and discharged, and the characteristics of the cathode materials were evaluated. At that time, charge and discharge were performed at room temperature (23° C.) through the following steps. At first, after a constant current charge was performed until the battery voltage reached 4.4 V at a constant current of 0.5 mA/cm², a constant voltage charge was performed until the current became 0.05 mA/cm² or less at a constant voltage of 4.4 V. Next, a constant current discharge was performed until the battery voltage reached 2.5 V at a constant current.

Figure 20:
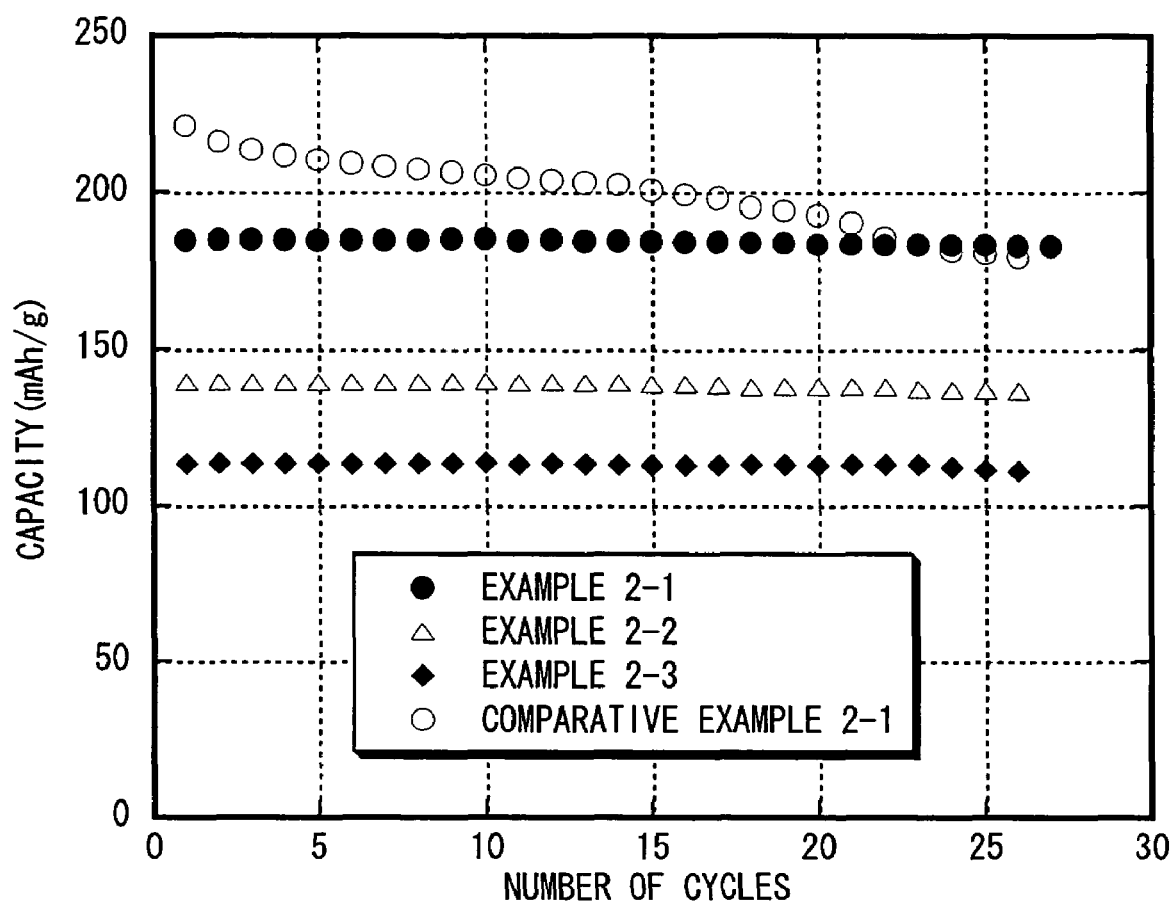
FIG. 20 is a plot showing a relationship between a discharge capacity and the number of cycles in Examples 2-1 through 2-3 and Comparative Example 2-1.

FIGS. 16, 17, 18 and 19 show charge-discharge curves of Example 2-1, Example 2-2, Example 2-3 and Comparative Example 2-1, respectively, and FIG. 20 shows changes in discharge capacities in Examples 2-1 through 2-3 and Comparative Example 2-1 by the number of cycles. Further, Table 6 shows a charge capacity and a discharge capacity in the first cycle and a capacity retention ratio of a discharge capacity in the 25th cycle in each of Examples 2-1 through 2-3 and Comparative Example 2-1.

TABLE 5

| | COMPOSITION MOLAR RATIO OF MATERIALS | | | | | | |
| --- | --- | --- | --- | --- | --- | --- | --- |
| | LiOH·H$_2$O | MnCO$_3$ | Cr(NO$_3$)$_3$·9H$_2$O | TiO$_2$ | Al(NO$_3$)$_3$·9H$_2$O | Mg(OH)$_2$ | COMPOSTION OF COMPLEX OXIDE |
| EXAMPLE 2-1 | 1.2 | 0.35 | 0.4 | 0.05 | — | — | $Li_{1.2}Mn_{0.35}Cr_{0.4}Ti_{0.05}O_2$ |
| EXAMPLE 2-2 | 1.2 | 0.35 | 0.4 | — | 0.05 | — | $Li_{1.2}Mn_{0.35}Cr_{0.4}Al_{0.05}O_2$ |
| EXAMPLE 2-3 | 1.2 | 0.35 | 0.4 | — | — | 0.05 | $Li_{1.2}Mn_{0.35}Cr_{0.4}Mg_{0.05}O_2$ |
| COMPARATIVE EXAMPLE 2-1 | 1.2 | 0.4 | 0.4 | — | — | — | $Li_{1.2}Mn_{0.4}Cr_{0.4}O_2$ |

TABLE 6

| | CHARGE CAPACITY IN FIRST CYCLE (mAh/g) | DISCHARGE CAPACITY IN FIRST CYCLE (mAh/g) | CAPACITY RETENTION RATIO IN 25TH CYCLE (%) |
|---|---|---|---|
| EXAMPLE 2-1 | 295 | 184 | 99 |
| EXAMPLE 2-2 | 224 | 139 | 98 |
| EXAMPLE 2-3 | 262 | 113 | 98 |
| COMPARATIVE EXAMPLE 2-1 | 304 | 221 | 81 |

As shown in FIG. 20 and Table 6, in Examples 2-1 through 2-3 in which titanium, aluminum or magnesium was included, superior charge-discharge cycle characteristics were obtained, compared to Comparative Example 2-1 in which none of them was included. In other words, it was found out that when at least one kind selected from the group consisting of titanium, aluminum and magnesium was included in addition to manganese and chromium, the crystalline structure could be stabilized, and the charge-discharge cycle characteristics could be improved.

In the above examples, the compositions of the complex oxides $Li_aMn_bCr_cAl_{1-b-c}O_d$ and $Li_{1+e}(Mn_fCr_gM_{1-f-g})_{1-e}O_h$ are described referring to specific examples; however, a complex oxide with any other composition can obtain the same effects, as long as the composition is within a range described in the above embodiment.

The invention is described referring to the embodiment and the examples, but the invention is not limited to the embodiment and the examples, and is variously modified. For example, in the embodiment and the examples, the case where a complex oxide including lithium, manganese, chromium and at least one kind selected from the group consisting of titanium, magnesium and aluminum is included as a cathode material is described; however, in addition to the complex oxide, any lithium complex oxide such as $LiCoO_2$, $LiNiO_2$, $LiMnO_2$ or $LiMn_2O_4$, any lithium sulfide, any lithium-containing phosphate such as $LiMn_xFe_yPO_4$ or any high molecular weight material may be mixed.

Further, in the embodiment and the examples, the case where the electrolyte solution which is a liquid electrolyte is used is described; however, any other electrolyte may be used. Examples of the electrolyte include a gel electrolyte in which a high molecular weight compound holds an electrolyte solution, an organic solid electrolyte in which an electrolyte salt is dispersed in a high molecular weight compound having ionic conductivity, an inorganic solid electrolyte such as ionic conducting ceramic, ionic conducting glass or ionic crystal, a mixture of the inorganic solid electrolyte and the electrolyte solution, a mixture of the inorganic solid electrolyte and the gel electrolyte, and a mixture of the inorganic solid electrolyte and the organic solid electrolyte.

In addition, the embodiment and the examples are described referring to the coin type secondary battery. However, the invention is also applicable to secondary batteries with any other structure and any other shape such as a cylinder shape, a button shape or a prismatic shape, or secondary batteries with any other structure such as a winding structure in the same manner.

Further, in the embodiment and the examples, the case where the cathode material according to the invention is used for the secondary battery is described; however, the cathode material is applicable to any other batteries such as primary batteries.

Further, in the embodiment and the examples, the case where the materials are mixed with ethanol or water as a dispersion medium to form the cathode material is described; however, any other organic medium may be used as a dispersion medium to form the cathode material.

As described above, in the cathode material according to the invention, in addition to manganese and chromium, at least one kind selected from the group consisting of titanium, magnesium and aluminum is included, so the crystalline structure can be stabilized, and the charge-discharge capacity and the charge-discharge cycle characteristics can be improved. Moreover, the composition ratio of lithium to the total of manganese, chromium, titanium, magnesium and aluminum is larger than 1 in molar ratio, so the charge capacity can be further improved, and even after charge, a certain amount of lithium remains in the crystalline structure, so the stability of the crystalline structure can be further improved.

Moreover, in the method of manufacturing the cathode material according to the invention, when the materials are mixed, less toxic ethanol or water is used as a dispersion medium, so the cathode material can be easily and economically manufactured.

Further, in the battery according to the invention, the cathode material according to the invention is used, so a larger charge-discharge capacity and superior charge-discharge cycle characteristics can be obtained.

Obviously many modifications and variations of the present invention are possible in the light of the above teachings. It is therefore to be understood that within the scope of the appended claims the invention may be practiced otherwise than as specifically described.

What is claimed is:

1. A cathode material, comprising:
a complex oxide including lithium (Li), manganese (Mn), chromium (Cr) and aluminum (Al),
wherein,
the complex oxide is represented by a chemical formula $Li_aMn_bCr_cAl_{1-b-c}O_d$ (where the values of a, b, c and d are within the ranges of $1.4<a<1.55$, $0.5<b+c<1$, $1.8<d\leqq2.5$).

2. A method of manufacturing a cathode material, the cathode material comprising a complex oxide including lithium (Li), manganese (Mn), chromium (Cr) and aluminum (Al), and the complex oxide is represented by a chemical formula $Li_aMn_bCr_cAl_{1-b-c}O_d$ (where the values of a, b, c and d are within the ranges of $1.4<a<1.55$, $0.5<b+c<1$, $1.8<d\leqq2.5$), the method comprising the step of:
mixing materials with ethanol as a dispersion medium to synthesize the complex oxide.

3. A battery, comprising:
a cathode;
an anode; and
an electrolyte,
wherein,
the cathode comprises a complex oxide including lithium (Li), manganese (Mn), chromium (Cr) and aluminum (Al), and
the complex oxide is represented by a chemical formula $Li_aMn_bCr_cAl_{1-b-c}O_d$ (where the values of a, b, c and d are within the ranges of $1.4<a<1.55$, $0.5<b+c<1$, $1.8<d\leqq2.5$).

4. A cathode material, comprising:
a complex oxide including lithium (Li), manganese (Mn), chromium (Cr) and at least one kind selected from the group consisting of titanium (Ti), magnesium (Mg) and aluminum (Al), wherein,
the complex oxide is represented by a chemical formula $Li_aMn_bCr_cAl_{1-b-c}O_d$ (where M is at least one kind of element selected from the group consisting of titanium (Ti), magnesium (Mg) and aluminum (Al), and where the values of a, b, c, and d are within the ranges of $1.4<a<1.55$, $0.5<b+c<1$, $1.8<d\leq2.5$).

5. A method of manufacturing a cathode material, the cathode material, comprising a complex oxide including lithium (Li), manganese (Mn), chromium (Cr) and at least one kind selected from the group consisting of titanium (Ti), magnesium (Mg) and aluminum (Al), the complex oxide is represented by a chemical formula $Li_aMn_bCr_cM_{1-b-c}O_d$ (where M is at least one kind of element selected from the group consisting of titanium (Ti), magnesium (Mg) and aluminum (Al), and where the values of a, b, c, and d are within the ranges of $1.4<a<1.55$, $0.5<b+c<1$, $1.8<d\leq2.5$), the method comprising the step of:

mixing materials with ethanol as a dispersion medium to synthesize the complex oxide.

6. A method of manufacturing a battery comprising a cathode, an anode, and an electrolyte, the cathode having a cathode material comprising a complex oxide including lithium (Li), manganese (Mn), chromium (Cr) and at least one kind selected from the group consisting of titanium (Ti), magnesium (Mg) and aluminum (Al), the complex oxide is represented by a chemical formula $Li_aMn_bCr_cM_{1-b-c}O_d$ (where M is at least one kind of element selected from the group consisting of titanium (Ti), magnesium (Mg) and aluminum (Al), and where the values of a, b, c, and d are within the ranges of $1.4<a<1.55$, $0.5<b+c<1$, $1.8<d\leq2.5$), the method comprising the step of:

mixing materials with ethanol as a dispersion medium to synthesize the complex oxide.

\* \* \* \* \*